(12) United States Patent
Strong

(10) Patent No.: US 10,644,487 B1
(45) Date of Patent: May 5, 2020

(54) LOW PROFILE RACEWAY

(71) Applicant: STRONG PRODUCTS GROUP, LTD., Dallas, TX (US)

(72) Inventor: Clinton Strong, Dallas, TX (US)

(73) Assignee: Legrand Connectrac, Dallas, TX (US)

( * ) Notice: Subject to any disclaimer, the term of this patent is extended or adjusted under 35 U.S.C. 154(b) by 0 days.

(21) Appl. No.: 16/411,468

(22) Filed: May 14, 2019

Related U.S. Application Data

(63) Continuation of application No. 15/985,693, filed on May 21, 2018, now Pat. No. 10,333,283.

(60) Provisional application No. 62/508,904, filed on May 19, 2017.

(51) Int. Cl.
*H02G 3/04* (2006.01)
*H02G 3/30* (2006.01)
*H02G 1/08* (2006.01)
*H01R 27/02* (2006.01)

(52) U.S. Cl.
CPC ............ *H02G 3/0437* (2013.01); *H02G 1/08* (2013.01); *H02G 3/0418* (2013.01); *H02G 3/24* (2013.01); *H01R 27/02* (2013.01)

(58) Field of Classification Search
CPC ...... H02G 3/0437; H02G 1/08; H02G 3/0418; H02G 3/24; H02G 3/00; H02G 3/0406; H02G 3/0431; H01R 27/02; H01R 27/00
USPC ..... 174/480, 481, 50, 53, 57, 58, 68.1, 68.3, 174/95, 97, 96, 99 R, 72 R; 248/68.1, 49
See application file for complete search history.

(56) References Cited

U.S. PATENT DOCUMENTS

| | | | | |
|---|---|---|---|---|
| 4,907,767 A | * | 3/1990 | Corsi | H02G 3/0418 174/97 |
| 5,024,614 A | * | 6/1991 | Dola | H02G 3/0431 174/486 |
| 5,134,250 A | * | 7/1992 | Caveney | H02G 3/0418 174/97 |
| 5,336,849 A | * | 8/1994 | Whitney | E04F 17/08 174/101 |
| 6,284,974 B1 | * | 9/2001 | Albert | H02G 3/0418 174/68.3 |
| 6,323,421 B1 | * | 11/2001 | Pawson | H02G 3/0418 174/503 |
| 6,355,880 B1 | * | 3/2002 | Bateson | H02G 3/105 174/488 |
| 6,878,881 B1 | * | 4/2005 | Henry | H02G 9/02 174/72 C |
| 6,972,367 B2 | * | 12/2005 | Federspiel | H02G 3/0418 174/481 |
| 7,612,300 B2 | * | 11/2009 | Owens | H02G 3/0437 174/480 |
| 7,615,710 B2 | * | 11/2009 | Sayres | H02G 3/0418 174/480 |

(Continued)

*Primary Examiner* — Angel R Estrada
(74) *Attorney, Agent, or Firm* — Ferguson Braswell Fraser Kubasta PC; Elizabeth Philip Dahm; Kelly J. Kubasta

(57) ABSTRACT

In various implementations, a raceway may include a housing with walls and arms extending from the housing. A cavity may be disposed in the housing and cables may reside in the cavity, during use. The cables may provide connectivity to receptacles of the raceway and thus a variety of devices. A cover may be utilized with the housing to facilitate access to the cables in the cavity of the housing. In some implementations, the cover may be retained by flexible arms of the housing. The raceway may be configured to receive wire clips to retain cables and/or conduit disposed in a cavity of the raceway.

20 Claims, 15 Drawing Sheets

(56) References Cited

U.S. PATENT DOCUMENTS 7,829,797 B2 * 11/2010 VanderVelde .......... H02G 3/128
174/481

* cited by examiner

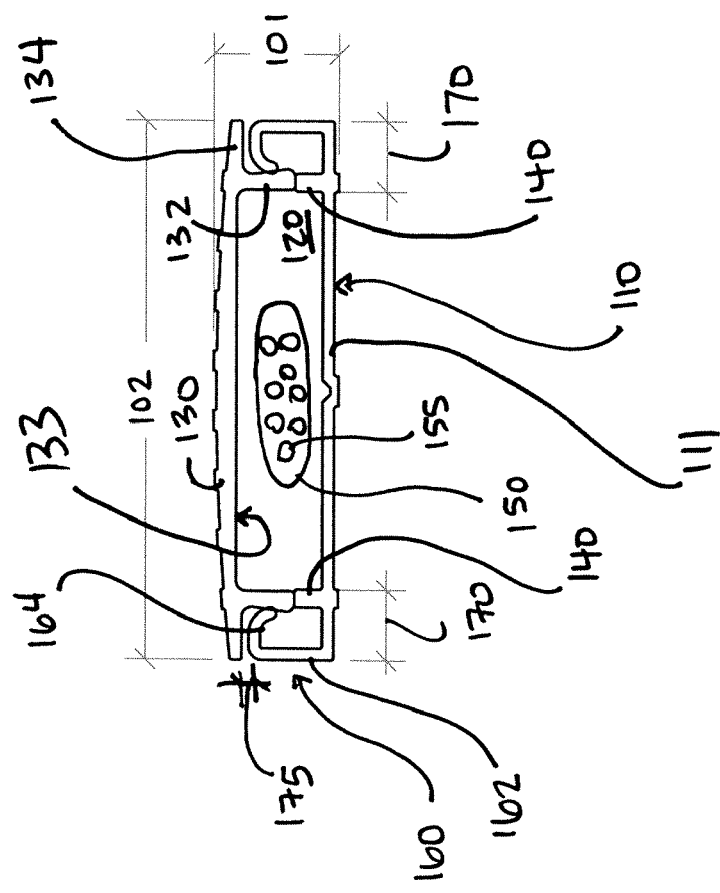

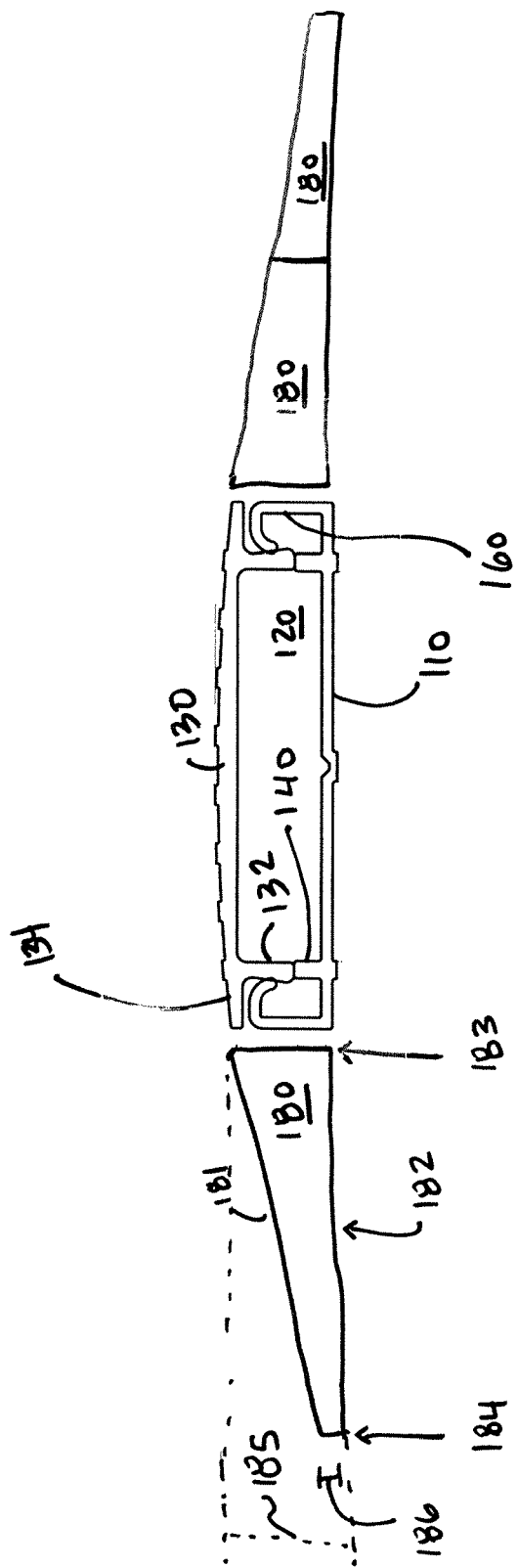

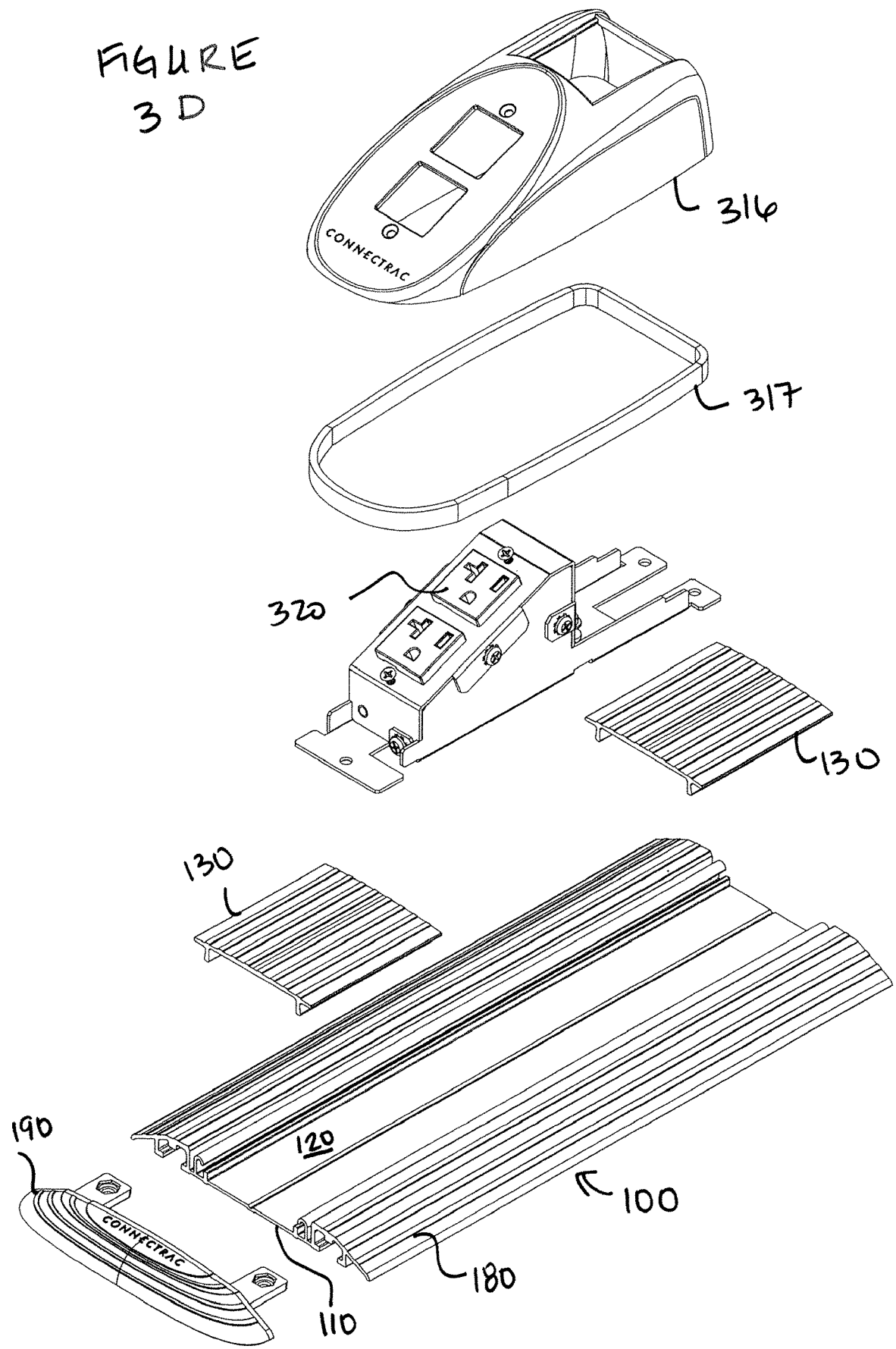

Figure 4A
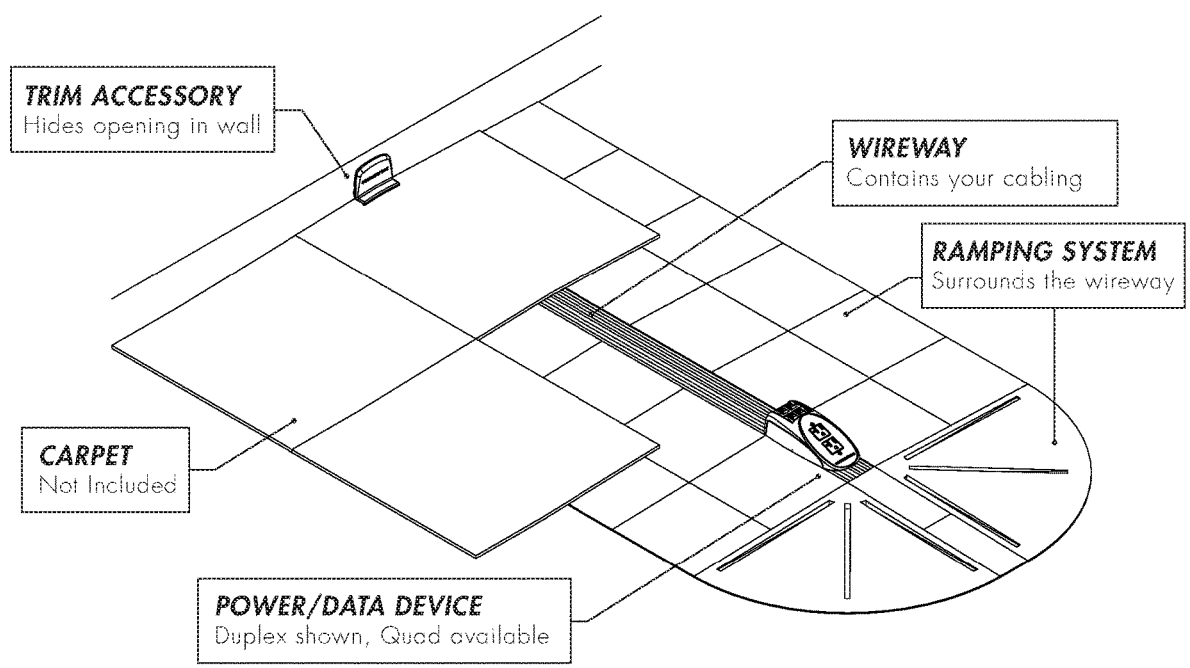
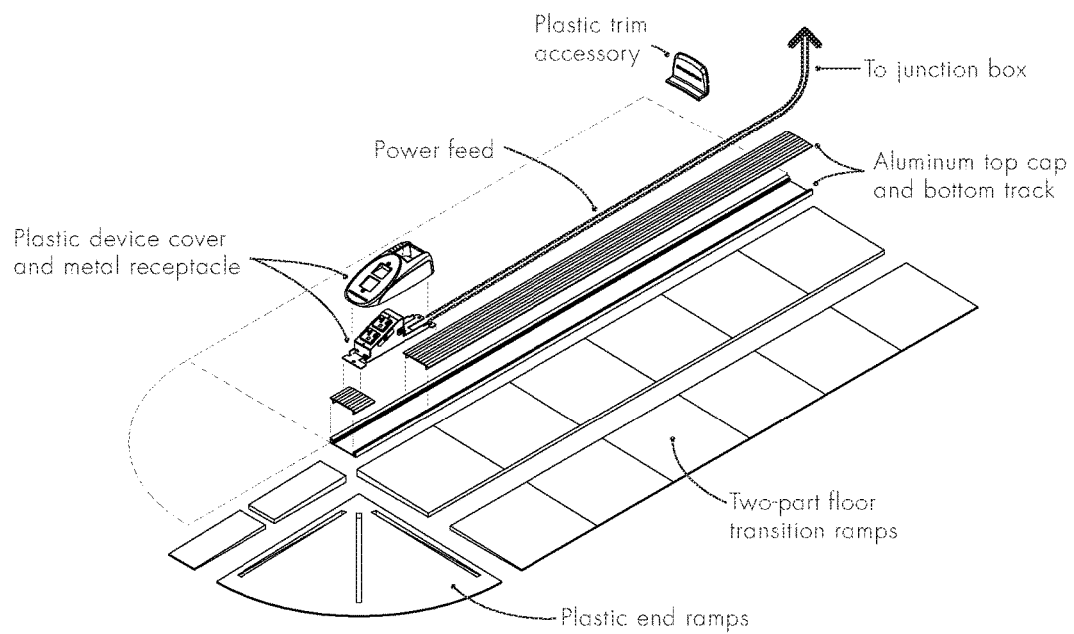
Figure 4B

Figure 5A
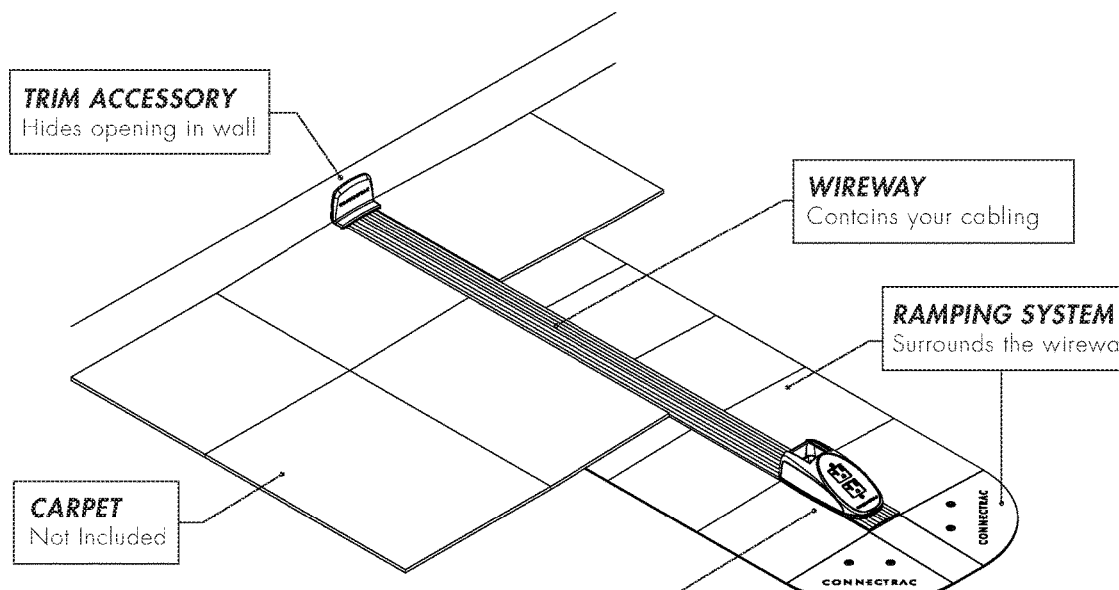
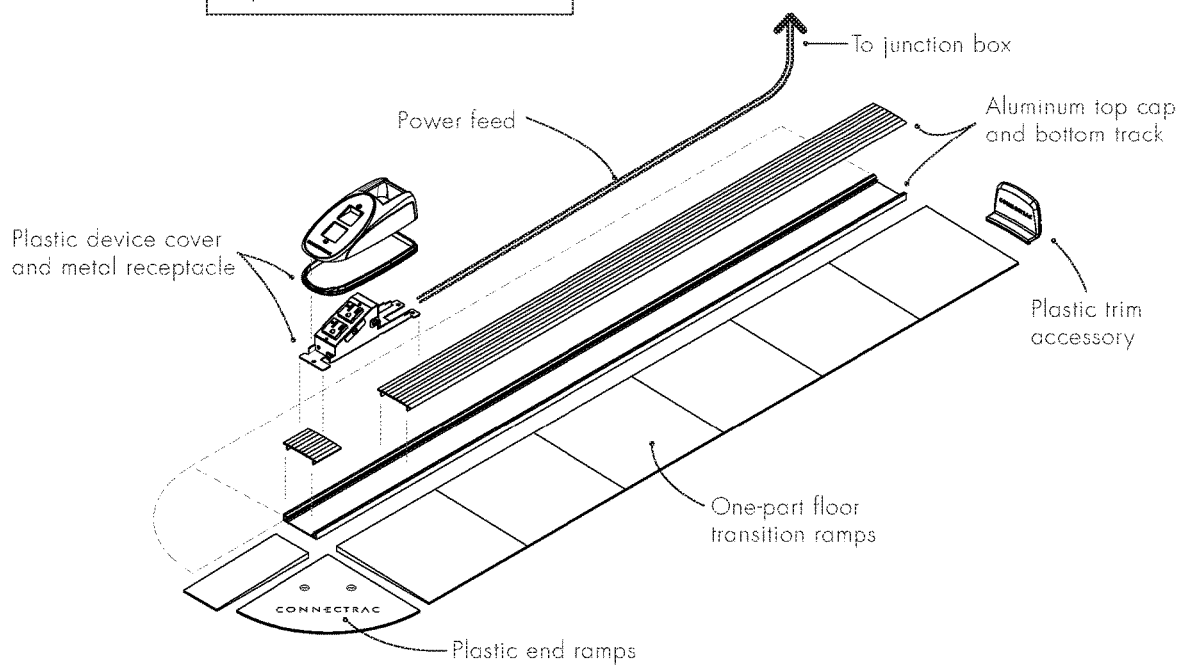
Figure 5B

Figure 6A
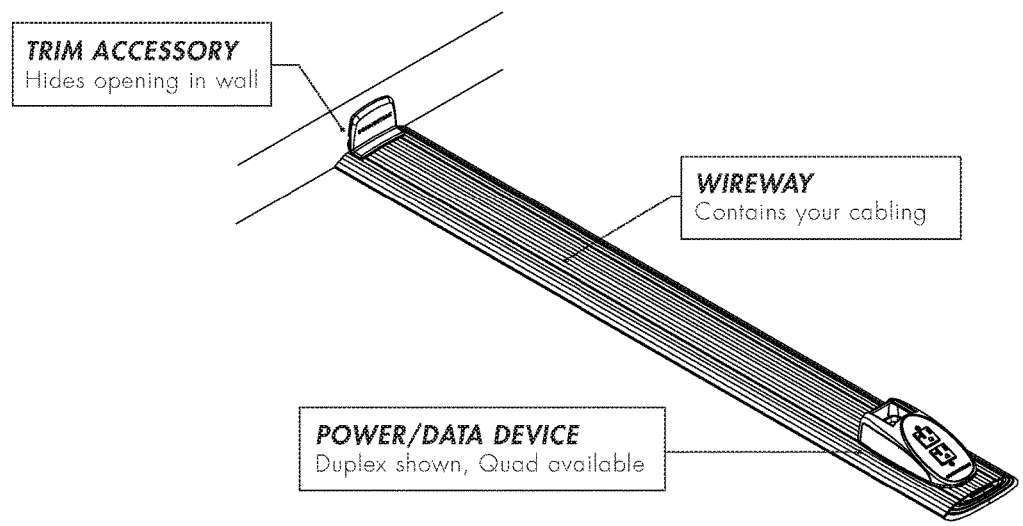
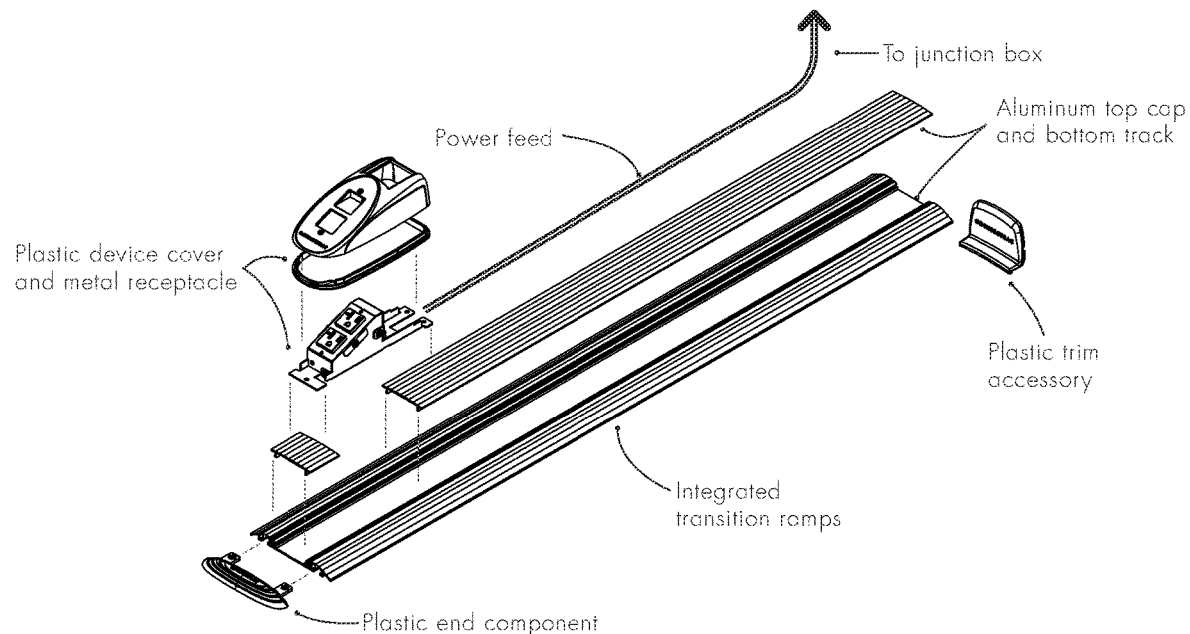
Figure 6B

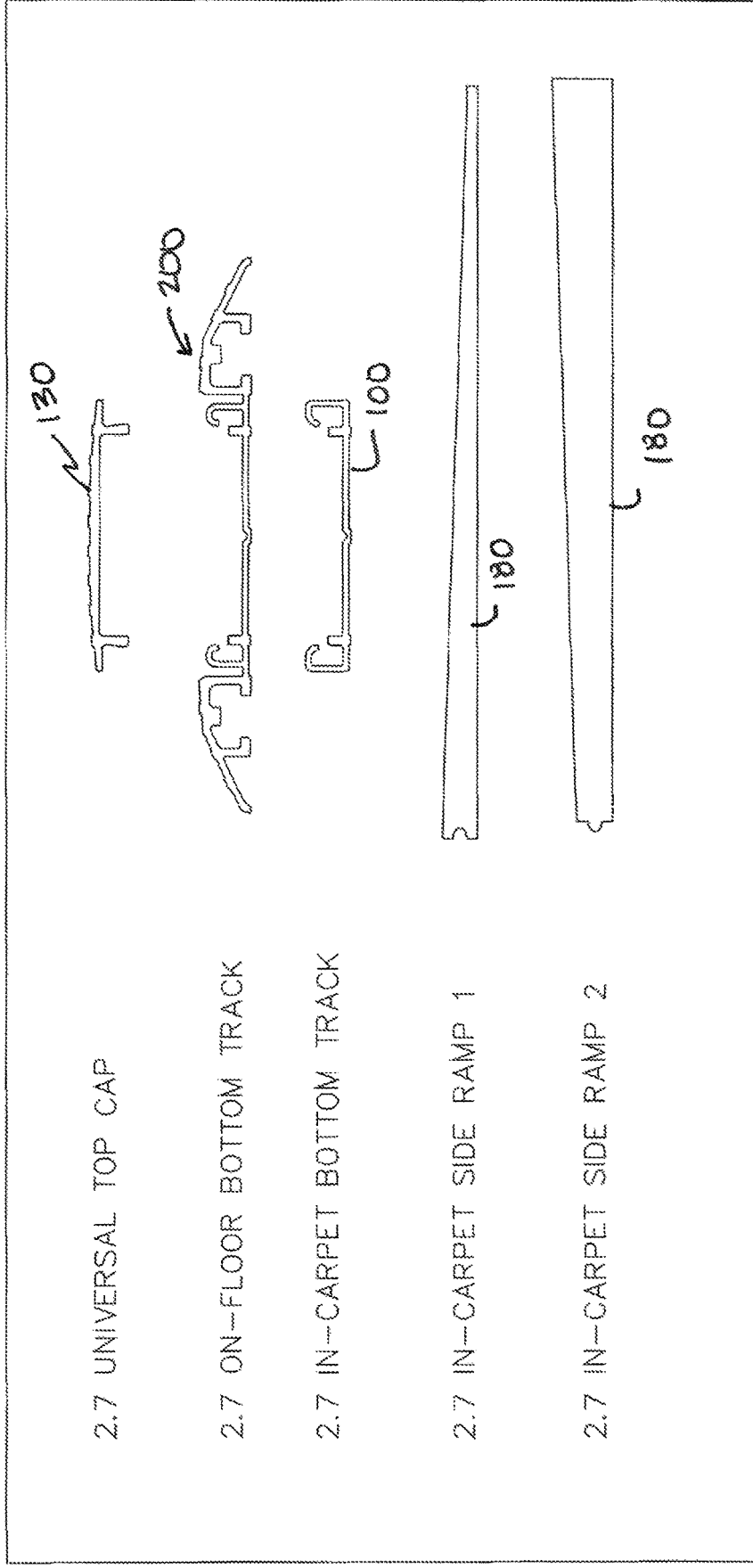

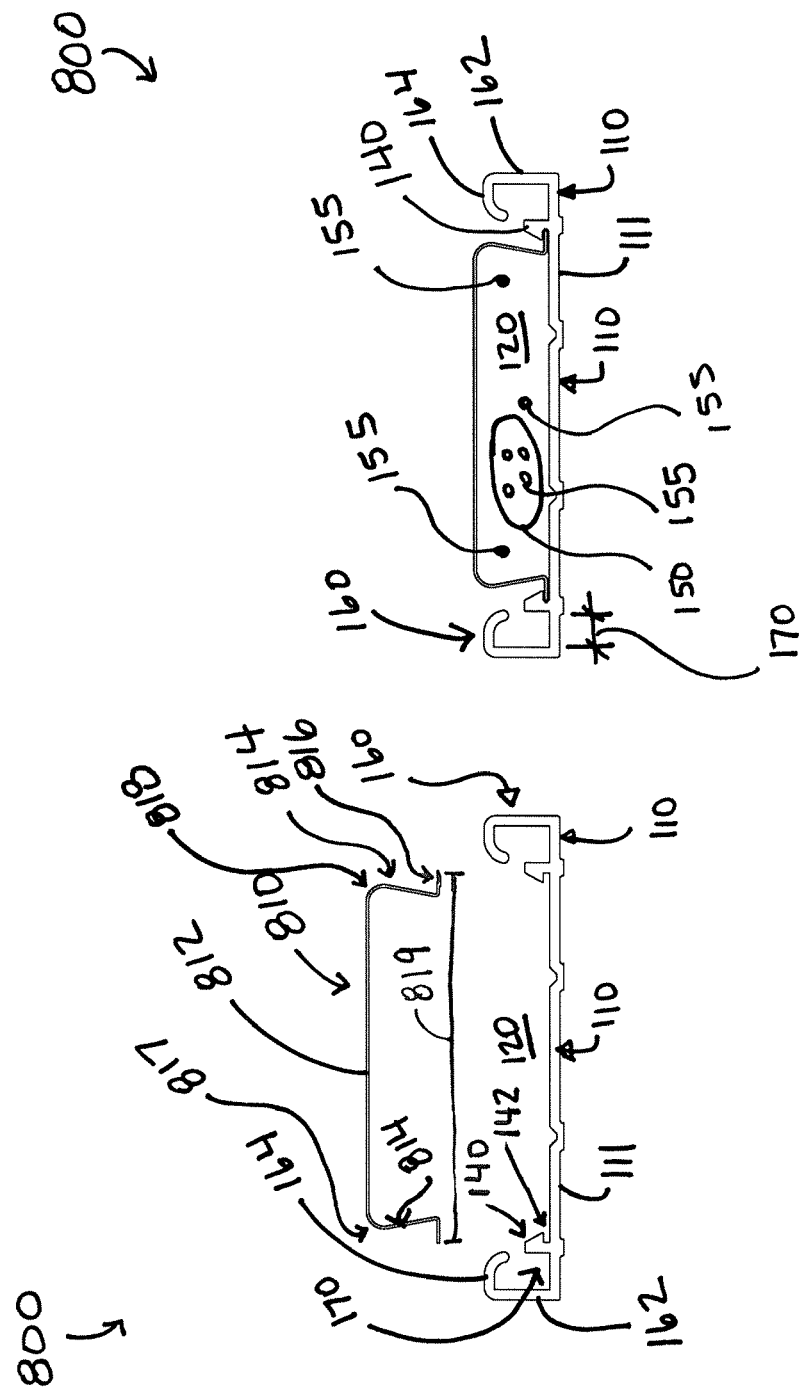

US 10,644,487 B1

LOW PROFILE RACEWAY

CROSS-REFERENCE TO RELATED APPLICATION

This application is a continuation of U.S. Provisional patent application Ser. No. 15/985,693 entitled "Low Profile Raceway" and filed on May 21, 2018 and issued as U.S. Pat. No. 10,333,283 on Jun. 25, 2019, which claims the benefit of U.S. Provisional Patent Application No. 62/508,904 entitled "Low Profile Raceway" and filed on May 19, 2017, both of which are hereby incorporated by reference for all purposes.

TECHNICAL FIELD

The present invention relates to raceways.

BACKGROUND

Power and communications capabilities can be provided to a location (e.g., desks, conference tables, televisions, etc.) in a structure by modifying and/or providing new electrical and communication wiring. Often providing new wiring or modifying existing wiring to a location may include coring through concrete flooring, creating openings in walls, and/or otherwise making modifications to the structure. In addition, as needs change, the wiring may need to be adjusted to accommodate wiring location layout changes, new types of data connectivity, and/or the need for additional connectivity. These changes may include making further modifications to the structure. There exists a need for raceways that are flexible and allow modifications to power and communication capabilities.

SUMMARY

In various implementations, raceways may provide power, communication, and/or other capabilities to a location in a structure. The raceway may be low-profile. The raceway may include a housing with a cavity and a cover. The housing may include arm(s) to couple with the cover and structural wall(s) to support at least a portion of a load (e.g., static and/or dynamic) applied to the cover.

A raceway may include cable(s) disposed in the cavity of the housing that are capable of providing power and/or communications capability. For example, the cable(s) may be coupled to power source(s) and/or communication source(s). The raceway may include one or more receptacles that allow device(s) to be coupled to cable(s) to provide power and/or communication capability to the device(s).

The raceway may be utilized in a variety of applications. For example, the raceway may be installed in and/or above a floor. The raceway may be installed such that the raceway is covered by flooring (e.g., under-flooring installation) and/or is visible through the flooring (in-floor installation). In some implementations, the raceway may be installed on the flooring (e.g., above-flooring).

In some implementations, a raceway may be provided in a kit that allows flexible installation and/or later modification of the raceway.

In various implementations, a raceway may provide connectivity (e.g., to devices, furniture, etc.) via receptacles. The housing of the raceway may include a base, flexible arms, and structural walls. The base may include a first side, a second side, and a length. The raceway may include two flexible arms extending from the base of the housing. A flexible arm may be disposed proximate the first side of the base and the other flexible arm may be disposed proximate the second side of the base. A flexible arm may include a planar portion and a curved portion. The structural walls may extend from the base of the housing. A structural wall may be disposed between the two flexible arms, in some implementations. A gap may reside between each of the flexible arms and each of the structural walls. A structural wall may be capable of supporting a cover disposed on the structural wall and/or predetermined forces applied to the cover (e.g., per code, etc.). A cavity may be disposed between the two structural walls. The cavity may be capable of receiving cables and/or conduit for providing connectivity (e.g., power, data, etc.).

Implementations may include one or more of the following features. The raceway may include at least one cover configured to couple with the housing. The cover may include two walls extending from an inner side of the cover. In some implementations, each of the walls may be disposed such that when the cover is inserted into the raceway, each of the walls is configured to be disposed on one of the structural walls of the raceway such that force exerted on the cover is at least partially transferred to the two structural walls of the raceway. The cover may include a first flange extending from a first end of the cover and/or a second flange extending from a second end of the cover. The first flange and/or the second flange may inhibit damage to the raceway. A first cover gap may reside between the first flange and one of the flexible arms of the raceway and/or a second cover gap may reside between the second flange and the other flexible arm of the raceway. The raceway may include cable(s) and/or conduit(s) disposed in at least one of the cavities of the raceway. A flexible arm of the raceway may include a first end of the planar portion with greater thickness than a second end of the planar portion to allow the second end to deform when subject to a predetermined force. The raceway may have a height of less than approximately 1 inch and/or a width of between approximately 2 and approximately 3 inches. The raceway may include ramps. For example, a first ramp may be coupled to the first side of the base and/or a second ramp coupled to the second side of the base. A first ramp may be disposed proximate the first side of the base and/or a second ramp may be disposed proximate the second side of the base. The raceway may include cable(s) to provide connectivity and the cable(s) may be disposed in the cavity of the raceway. The raceway may include receptacle(s) coupled to the raceway and the receptacle(s) may be coupled to cable(s) such that the receptacle(s) can provide connectivity via one or more of the coupled cables. A receptacle may include socket(s) and/or port(s). In some implementations, structural wall(s) of the raceway may include recess(es) capable of receiving a portion of a wire clip. The raceway may include wire clip(s) to retain cable(s) and/or conduit(s) in the cavity of the raceway. A wire clip may include a base, a first flange disposed at a first end of the base, and/or a second flange disposed at the second end of the base. In some implementations, the first flange of the wire clip is configured to be disposed at least partially in at least one of the recesses in at least one of the structural walls of the raceway and the second flange of the wire clip is configured to be disposed at least partially in at least one of the recesses in at least one of the other structural walls of the raceway.

In various implementations, a raceway may be installed on floor, under flooring, and/or in floor. A method of installing a raceway may include providing a raceway at a location. The housing of the raceway may include a base, one or more structural walls, and one or more flexible arms. The base of the housing may include a first side, a second side, and a length. A flexible arm may extend from the base of the housing. A flexible arm may be disposed proximate a side of the base (e.g., a first flexible arm may be disposed proximate a first end and/or a second flexible arm may be disposed proximate an opposing end of the base). A flexible arm may include, in some implementations, a planar portion and a curved portion. The structural wall(s) may extend from the base of the housing. A gap may reside between each of the flexible arms and each of the structural walls. A structural wall may be capable of supporting a cover disposed on the structural wall and/or a predetermined force exerted on the cover. One or more cavities may be disposed in the raceway. A cavity may be capable of receiving cable(s) and/or conduit(s) (e.g., including multiple cables) for providing connectivity. One or more cables may be disposed in at least one of the cavities in the raceway and/or one or more covers may be coupled to the raceway. A cover may include at least two walls extending from an inner surface of the cover. Coupling a cover to the raceway may include inserting the cover at least partially into the raceway such that each of the walls of the cover is disposed at least partially in the raceway and is disposed on one of the structural walls. Inserting a cover at least partially into the raceway may cause the flexible arm or a portion thereof to at least partially deform and couple the raceway and the cover.

Implementations may include one or more of the following features. Installing a raceway may include retaining one or more of the cables in at least one of the cavities by coupling one or more wire clips to the raceway. Coupling the one or more wire clips to the raceway may include inserting flanges of each of the wire clips into recesses disposed in each of the structural walls of the raceway. Installing a raceway may include disposing and/or coupling one or more ramps proximate one or more of the sides of the base. In some implementations, ramps may be integrated into the raceway. In some implementations, a ramp may be selected for disposing and/or coupling proximate ends of the raceway based on the location in which the raceway is installed (e.g., type of flooring, in floor, on floor, under floor, etc.).

In various implementations, a raceway may provide connectivity (e.g., to devices, furniture, etc.) via receptacles coupled to the raceway. The housing of the raceway may include a base, flexible arm(s) extending from the base, and structural wall(s). The base may include a first side, a second side, and a length. The raceway may include at least one flexible arm extending from the base of the housing. In some implementations, the raceway may include at least two flexible arms. A flexible arm may be disposed proximate a side of the base. A flexible arm may include a planar portion and/or a curved portion. The raceway may include two or more structural walls extending from the base of the housing. A gap may reside between each of the flexible arms and each of the structural walls. A structural wall may be capable of supporting a cover disposed on the structural wall and/or a predetermined force exerted on the cover (e.g., per code, per usual loads for a location, per user selection, etc.). The raceway may include one or more cavities disposed in the raceway. A cavity may receive cable(s) and/or conduit to providing connectivity.

Implementations may include one or more of the following features. In some implementations, the planar portion of the flexible arm may be flexible and/or the curved portion may be rigid. The structural walls may be disposed between the arms of the raceway. The raceway may include at least one cover capable of coupling with the housing. A cover may include at least two walls extending from an inner side of the cover. The walls may be disposed such that when the cover is inserted into the raceway, each of the walls is configured to be disposed on one of the structural walls of the raceway such that force exerted on the cover is at least partially transferred to at least one of the structural walls of the raceway. One or more of the structural walls may include one or more recesses capable of receiving a portion of a wire clip. A wire clip may retain cables disposed in at least one of the cavities of the raceway, when the wire clip is coupled to the raceway.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which:

FIG. 1A illustrates a cross-sectional view of an implementation of an example raceway.

FIG. 2B illustrates a cross-sectional view of an implementation of an example raceway that includes ramps.

FIG. 3D illustrates an exploded view of an implementation of an example raceway that includes a receptacle.

FIG. 4A illustrates an implementation of a portion of an under-flooring configuration for an example raceway.

FIG. 4B illustrates an exploded view of an implementation of an under-flooring configuration illustrated in FIG. 4A.

FIG. 5A illustrates an implementation of a portion of an in-flooring configuration for an example raceway.

FIG. 5B illustrates an exploded view of an implementation of an in-flooring configuration illustrated in FIG. 5A.

FIG. 6A illustrates an implementation of an on-flooring configuration for an example raceway.

FIG. 6B illustrates an exploded view of an implementation of an on-flooring configuration illustrated in FIG. 6A.

FIG. 7 illustrates an implementation of an example kit 700.

FIG. 8A illustrates a front exploded view of an implementation of an example raceway and wire clip.

FIG. 8B illustrates a front view of an implementation of the example raceway, illustrated in FIG. 8A, with a coupled wire clip.

DETAILED DESCRIPTION

Figure 1B:
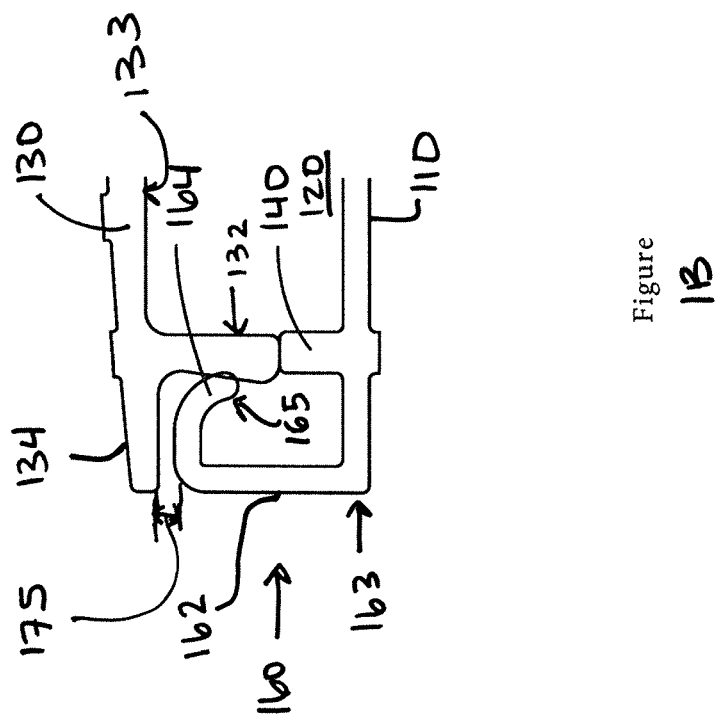
FIG. 1B illustrates cross-sectional view of an implementation of a portion of an example raceway.

In various systems and processes, connectivity, such as power and data connectivity, may be provided to one or more locations (e.g., in a structure and/or outdoors) temporarily and/or permanently using a raceway system. The raceway system or raceway may include a housing in which conduit(s) may be at least partially disposed. A conduit may provide electrical (e.g., power), communication (e.g., data, telephone, video, etc.), and/or other types of connectivity via one or more cables disposed in the conduit. In some implementations, one end, for example, of the raceway may be coupled to a connectivity source (e.g., power source and/or source of communications connectivity). For example, the raceway may be coupled to power lines, Ethernet lines, fiber optic lines, and/or other types of lines in a wall of a structure, for example. In various implementations, receptacle(s) may be coupled to the raceway such that connectivity may be provided by the raceway to the receptacle(s) independent of whether other receptacle(s) are coupled or uncoupled to other locations on the raceway.

The raceway may be installed in a location (e.g., a building, a park, and/or other locations) to provide connectivity proximate the raceway. For example, the raceway may be installed on a floor (e.g., inside a building and/or outside a building), on a wall, and/or a ceiling. In some implementations, the raceway may be capable of providing connectivity at fixed locations along the raceway.

A raceway may have cross-sectional shape along a length of the raceway. The cross-sectional shape may be consistent across the length or vary. The raceway may have any appropriate cross-sectional shape. For example, the cross-section may have a rectangular shape, an oval shape, any other regular shape and/or irregular shape. The length of the raceway may be based on a configuration of a location, in some implementations. For example, the length may extend at least partially across a location such as a room. The raceway may be provided in predetermined lengths and/or may be cut to size, in some implementations. The width and/or height of the raceway in the cross-section may have any appropriate size. For example, the width and/or height may accommodate 3 wires (e.g., power, communications, etc.). The width and/or height may be selected such that the raceway has a low profile.

In some implementations, more than one raceway may be utilized in a location. For example, in a conference room, rows and/or columns of raceways may be installed to provide connectivity (e.g., power and/or communications) to devices (e.g., desks, conference tables, laptops, phones, projectors, screens, etc.).

FIG. 1A illustrates a cross-sectional view of an implementation of an example raceway 100. The cross-section may be fixed or vary across a length of the raceway. The cross-section of the raceway may have a height 101 and a width 102. Although one raceway is illustrated, in some implementations, more than one raceway may be disposed in a location. More than one raceway may be disposed side by side (e.g., contacting and/or not contacting other raceways) in a location. For example, two or more raceways may be disposed approximately parallel relative to each other (e.g., the distance between the raceways may be the same, vary, and/or be different). In some implementations, raceways may intersect, partially intersection, overlap, partially overlap, merge, and/or be disposed in any other appropriate layout in a location. For example, a first raceway may include data cabling and a second raceway disposed proximate the first raceway may include power cabling. In some implementations, raceways disposed proximate each other (e.g., side-by-side) may have power and data cabling.

The raceway 100 may include a housing 110 with a cavity 120 disposed in the housing, and a cover 130 disposed at least partially over the cavity 120. The housing may have any appropriate shape. As illustrated, the housing may be approximately U-shaped.

The housing 110 may include two or more structural walls 140 extending from a base 111 of the housing 110. The cover may rest (e.g., contact) on the structural walls, and the structural walls of the housing may support the cover and/or a predetermined force exerted on the cover (e.g., individual(s) standing on the cover, furniture disposed on the cover, carts moving over the cover, ordinary loads for a location, user specified loads, and/or code required loads). In some implementations, the structural walls may have a height that is less than the height of other portions of the housing (e.g., arm 160). Thus, when the cover rests on the structural wall, at least a portion of a cover is disposed in the housing. The structural walls may extend at least partially along a length of the housing of the raceway.

In some implementations, the raceway may include materials, such as aluminum, to support predetermined loads without damaging contents of the cavity (e.g., cables). The raceway may have a height and thickness to provide the sufficient support of loads on the cover. For example, the structural walls may have strength sufficient to support the cover and/or to allow a load exerted on a cover or portion thereof to be distributed at least partially to the structural wall(s). The structural walls may resist crushing of the raceway and/or portions thereof when subject to a predetermined weight (e.g., guidelines for static loads and/or dynamic loads, such as the weight of an average person standing on the raceway and/or a desk being positioned on top of a raceway). Since damage to the cable (e.g., crushing, crimping, etc.) may reduce and/or eliminate the connectivity provided by the cables, the structural walls may have a predetermined strength such that the cover does not deflect to damage conduit and/or cables disposed in the cavity of the housing (e.g., when subject to a predetermined weight).

The housing 110 of the raceway 100 may include a cavity 120 disposed in the housing. In some implementations, the raceway may include more than one cavity. At least one cavity 120 of the housing 110 may be disposed between the structural walls 140.

A cavity 120 of the raceway may have any appropriate size. For example, the cavity may allow more than one cable to be disposed in the cavity. The cavity may have a size such that cables and/or conduit in which cables may be disposed may be positioned within the cavity such that a cover may be coupled to the housing. Cables may include any appropriate cable. For example, cables may include power cables, communication cables, etc. For example, the cables may include power cords, CAT 5 cables, CAT 6 cables, phone cables, coaxial cable, fiber optic, etc. A single cable may be utilized as a conduit to provide power and communications connectivity, in some implementations. As illustrated, a conduit 150 that includes one or more cables 155 may be disposed in the cavity 120. For example, data and/or power cables may be disposed in the conduit.

A conduit may provide protection for cable(s) disposed at least partially in the cavity of the conduit and/or satisfy code (e.g., government, industry, and/or company) requirements in an application. For example, the conduit may be at least partially static resistant, fire resistant, abrasion resistant, and/or water resistant. The conduit may inhibit damage to the cables (e.g., crushing, moisture and/or debris) and/or facilitate installation. The conduit may be formed of any appropriate material such as metal(s), such as steel, and/or plastic. The conduit may be flexible. Flexible conduits may facilitate installation in raceways with bends (e.g., curves and/or angles) and/or in applications in which the conduit may be bent (e.g., to attach to receptacles). For example, the conduit may include a flexible steel conduit. The conduit may have any appropriate shape, such as oval, round, rectangular, other regular shapes, irregular shapes, and/or combinations thereof. In some implementations, an oval cross-sectional shape cable conduit may be utilized to inhibit crushing of the conduit in bends of the cable conduit and/or to reduce the profile of the raceway (e.g., since the height of the oval may be less than the width of the oval). In some implementations, the conduit may inhibit bending greater than a predetermined angle to inhibit damage to the cables in the conduit.

The housing 110 may include one or more arms 160 extending from a base 111 of the housing. One or more of the arms may be flexible (e.g., the arm or a portion thereof may elastically and/or inelastically deform upon the application of a predetermined force). As illustrated, the arm(s) 160 may be disposed more proximate the ends of the housing than the structural wall(s) 140. The arms may be disposed at or proximate an end of the housing. For example, the housing may include at least one first flexible arm disposed proximate a first end of the housing and at least one second rigid arm (e.g., an arm configured to not deform upon application of a predetermined load) may be disposed proximate a second end. When a cover is coupled to the housing, flexible arm(s) may deform to allow the cover to align with the housing and/or couple with the housing while the rigid arm may not deform.

In some implementations, the housing may include at least one flexible arm proximate each end and one or more of the flexible arms may deform when a cover is coupled to the housing. When a cover is coupled to the housing, the flexible arms may deform to allow the cover to align with the housing and/or couple with the housing. A cover may snap fit with the housing via the arms extending from the base 111 of the housing.

In some implementations, the deformation of the flexible arm, when the cover is inserted at least partially into the raceway, may exert a pressure on wall(s) of the cover such that the arms couple and/or retain the cover in the raceway.

A gap 170 may be disposed between a flexible arm 160 and a structural wall 140 (e.g., the gap may reside between the point where the flexible arm extends from the base and the point where the structural wall extends from the base). Utilizing separate arm(s) and structural wall(s) in the housing may increase operational life of the raceway since the structural wall may not be subject to repeat deformation as the flexible arms are deformed (e.g., when compared with a combination flexible arm and structural wall design).

The flexible arms may be elastically deformable, in some implementations. A flexible arm 160 may include a planar portion 162 and/or a curved portion 164. The planar portion 162 may be disposed proximate a first end of the flexible arm and the curved portion may be disposed proximate a second end of the flexible arm. The first end 163 of the flexible arm 160 may be coupled to the housing and/or the second end 164 of the flexible arm may be free (e.g., not coupled to the housing). As illustrated, the flexible arm may curve inwards towards the structural arm. The curved portion 164 of the flexible arm may have any appropriate shape (e.g., cane shaped, partially U-shaped, V-shaped, L-shaped etc.). In some implementations, a rounded portion of the curved portion may contact the cover (e.g., when a cover is coupled to the housing) to inhibit damage (e.g., scratching and/or wearing) of the cover from contact with the arms. The flexible arm may include an angled portion that angles towards the structural arm (e.g., an end may bend at an angle towards the structural portion).

The flexible arm may deform when the cover is positioned over the housing and fit into the housing. For example, the planar portion of a flexible arm may deflect as the cover is inserted into the raceway. The curved portion 164 of a flexible arm may inhibit damage to the cover or portions thereof (e.g., the rounded portion and/or surface of the flexible arm may inhibit scratching and/or other damage due to contact with walls of the cover). The curved portion 164 may facilitate guiding the cover into position with the housing. Although the flexible arm is deformable the flexible arm may limit the deformation when a predetermined force is applied to facilitate guiding the cover into position, in some implementations. For example, when a predetermined force is applied to the cover, the flexible arms on each side of the cover may deform but resist deformation greater than a predetermined amount to guide the cover into a predetermined position in the housing.

In some implementations, the flexible arm may vary in thickness. For example, a first end (e.g., of at least a portion of the flexible arm such as the planar portion) may have a greater thickness than the second end to allow the second end to deform when subject to a predetermined force and allow at least a portion of the first end to deform less and/or resist deformation.

In some implementations, the curved portion 164 may curve towards the structural wall, as illustrated in FIG. 1A. An end of the curved portion and/or flexible arm may contact a cover when the cover is coupled to the housing and/or retain the cover to allow the cover to be coupled to the housing.

The cover 130 may include at least two walls 132 extending from an inner side 133 of the cover. The wall(s) 132 may extend at least partially along a length of the cover. In some implementations, the raceway may include more than one cover to facilitate removal of the cover and/or replacement of the cover with a receptacle (e.g., with electrical sockets and/or data ports). For example, the cover may include more than one segment that couples with the raceway. To access to the cavity in a portion of the raceway, the segment of the cover above the cavity may be removed to allow access to the cavity.

At least one wall 132 of the cover 130 may contact a structural wall (e.g., a top surface) of the housing. In some implementations, contact surface of the wall of the cover and the contact surface of the structural wall may be configured to engage with each other. For example, the contact surface of the wall of the cover and the contact surface of the structural wall of the raceway may include planar portions to engage each other and to allow forces applied to the cover to be transferred at least partially to the raceway (e.g., via the structural wall(s)).

As illustrated, the walls (e.g. a bottom surface of the walls) of the cover contact the structural walls of the housing. The walls may facilitate transfer at least a portion of loads (e.g., static and/or dynamic loads) applied to the cover to structural wall(s). By transferring at least a portion of the load applied to the cover (e.g., by a person or object being disposed on the cover), the raceway may inhibit conduit and/or cables in the cavity of the housing from being crushed and/or otherwise damaged. For example, if a raceway is a low profile raceway, the height of the cavity may not be substantially greater (e.g., less than 0.2 inches) than a height of conduit and/or cables disposed in the cavity (e.g., when a cavity is filled with a maximum capacity of the cables). Thus, if a load is applied to the cover that causes the cover to bend greater than the free space in the cavity, contact between the cover and the conduit and/or cables may occur. This contact may damage the conduit and/or cables while may inhibit the raceway from providing connectivity and/or reduce the connectivity provided to devices. Thus, the structural walls may support at least a part of the load applied to the cover.

The cover 130 may include flanges 134. A flange(s) 134 of the cover 130 may extend from end(s) of the cover. As illustrated, the flanges 134 extend from the cover beyond the walls of the cover. The flange 134 of the cover 130 may inhibit damage to the raceway, such as fouling of the cavity of the raceway (e.g., inhibit entry of debris and/or fluids) and/or inhibit damage to the flexible arms of the raceway housing, and/or cover the raceway housing for aesthetic purposes to increase user satisfaction. As illustrated, a cover gap 175 may be disposed between a bottom surface of a flange of the cover and a flexible arm of the housing (e.g., the cover gap may be along an axis parallel to the height of the raceway). Allowing a cover gap 175 to reside between the flexible arm and the cover (e.g., flange of the cover) may inhibit loads applied to the cover from being applied to the flexible arms (e.g., to inhibit damage to the flexible arm and/or deformation of the flexible arm that would make the cover more difficult to remove when compared with an ordinary positioning of the cover). Since the flexible arm is deformable, when a predetermined load is applied to flexible arm the arm will bend. Thus, by inhibiting at least a portion of a load applied to the cover from being applied to the flexible arms, damage to the flexible arm(s) may be inhibited. Allowing a cover gap 175 to reside between a flexible arm of the housing and the wall of a cover may allow a load applied to a cover to be transferred to the structural wall(s) of the housing (e.g., a component of the raceway configured to accept loads) and/or inhibit the load from being applied to the flexible arm(s) of the housing (e.g., a component adapted to deform upon application of loads).

In some implementations, the cover 130 of the raceway is removable. Providing a removable cover may facilitate installation of the raceway at a location, facilitate modifications of the raceway (e.g., additional cables may be run through the raceway, cables may be accessed and/or repaired, cables may be removed, receptacles may be added and/or removed, etc.).

The cover 130 may be coupled (e.g., snap fitted) to a raceway without the use of tools, in some implementations. The cover 130 may be disposed over the housing and the curved portions may guide the cover into a predetermined alignment with the housing. Allowing the curved portions to guide the cover into a predetermined alignment with the housing may facilitate transfer of loads on the cover to the structural walls of the housing and inhibit the transfer of loads on the cover to one or more other portions of the housing (e.g., arms). When a predetermined force is applied to the cover, one or more of the flexible arms of the housing may deform (e.g., deflect, bend, increase curvature of curved portion, etc.) to allow the walls of the cover to align with the structural walls of the housing such that a load applied to the cover will be transferred to the structural walls of the housing via the walls of the cover. In some implementations, the housing may include a first flexible arm disposed proximate a first end and a second rigid arm disposed proximate a second end. The first flexible arm may deform when a predetermined force is applied to the cover and the second rigid arm may not deform. When a flexible arm deforms, the curvature of the curved portion may increase (e.g., an end may be pushed downward towards a bottom surface of the housing) and/or the planar portion or a portion thereof may be slanted. The second end of the arm(s) may contact a wall of the cover and retain (e.g., temporarily and/or until a force is applied to uncouple the cover) the cover. In some implementations, the cover wall may be adapted to be retained by the curved portion of the arm of the housing. For example, a cover wall may be flared (e.g., an end coupled to the cover may have a smaller thickness than an opposing end not coupled to the cover), the cover wall may include a recess (e.g., such that a second end of the arm may be disposed at least partially in the recess), the cover wall may include a protrusion (e.g., such that a second end of the arm may be disposed above the protrusion when the cover is coupled to the protrusions), other appropriate retaining members, and/or combinations thereof. FIG. 1B illustrates an implementation of a flared cover wall being retained by a curved portion of an arm of the housing.

The cover may be removable to allow access to the cavity disposed in the housing, to allow replacement of the cover, and/or to allow positioning of a receptacle in the raceway, etc. To remove the cover, a force may be applied to the cover to pull the cover off the housing. For example, the force may deform the arm(s) of the housing and release the cover. In some implementations, the force to remove the cover may be applied to one or more flanges of the cover.

In some implementations, the cover gap 175 may facilitate removal of a cover coupled to the housing. A tool (e.g., finger, screwdriver, etc.) may be disposed in the gap to pry the cover off the housing (e.g., by applying an upwards force that is greater than the force applied by the flexible arms to retain the cover in a coupled position) and uncouple the cover from the gap. For example, a user may dispose a driver (e.g., screwdriver, crowbar, etc.) at least partially in the gap 175 to apply a force to a surface of the flange and pull the cover at least partially off the housing. In some implementations, a user may pry the cover off the housing (e.g., with or without a tool) by gripping an end of the flange of the cover and applying an upwards force to the cover to release the cover from the housing.

In some implementations, the raceway 100 may be a low profile raceway. The height 101 of the raceway may be less than approximately 1 inch. The height of the raceway may be approximately 0.65 or less, in some implementations. The width 102 of the raceway may be between approximately 2 inches and approximately 3 inches. A gap 170 (e.g., between an arm and a structural wall of the housing) may be between 0.2 and 0.3 inches. A gap 175 (e.g., between a bottom surface of the cover and an arm) may be less than 0.1 inches. The cavity in the housing may be between 1 to 3 inches in width. The cavity may be approximately two inches in width, in some implementations. Thus, to allow a greater number of cables to be positioned in the cavity, a cavity may not include structural walls in the cavity extending to contact the cover. In some implementations, the cavity may be subdivided by structural walls and/or nonstructural walls.

Small reductions in the height of the raceway may substantially impact installation costs (e.g., decreased profile may decrease number of ramps utilized and/or may cost less since less material is utilized) and/or increase flexibility (e.g., since on-flooring raceway may be utilized in an application in which previously the floor may have been altered to allow use of a raceway). In some implementations, the height of the raceway may allow the raceway to be utilized above ground while not being a trip hazard (e.g., as determined by government and/or industry guidelines such as the Americans with Disabilities Act and/or OSHA). For example, the height that the raceway resides above flooring and/or the increase in height of a flooring caused by the raceway disposed in and/or under the flooring may not cause a trip hazard. Utilizing a low profile raceway may increase the flexibility of the raceway since the raceway may be utilized in on-flooring, in-flooring and under-flooring applications. Utilizing a low profile raceway may increase user satisfaction since the aesthetics of the raceway may be more desirable to a user when the raceway has a smaller footprint. For example, unlike conventional conduits used to house wires, which provide connectivity, across floors, the low profile raceway may allow installation below flooring, such as carpet squares, to improve user satisfaction (e.g., by improving aesthetics through reduced visibility of the raceway and/or reducing trip hazards). In some implementations, utilizing a low profile raceway may decrease costs since fewer ramps may be used in the raceway when inhibiting the raceway from being a trip hazard.

Figure 2A:
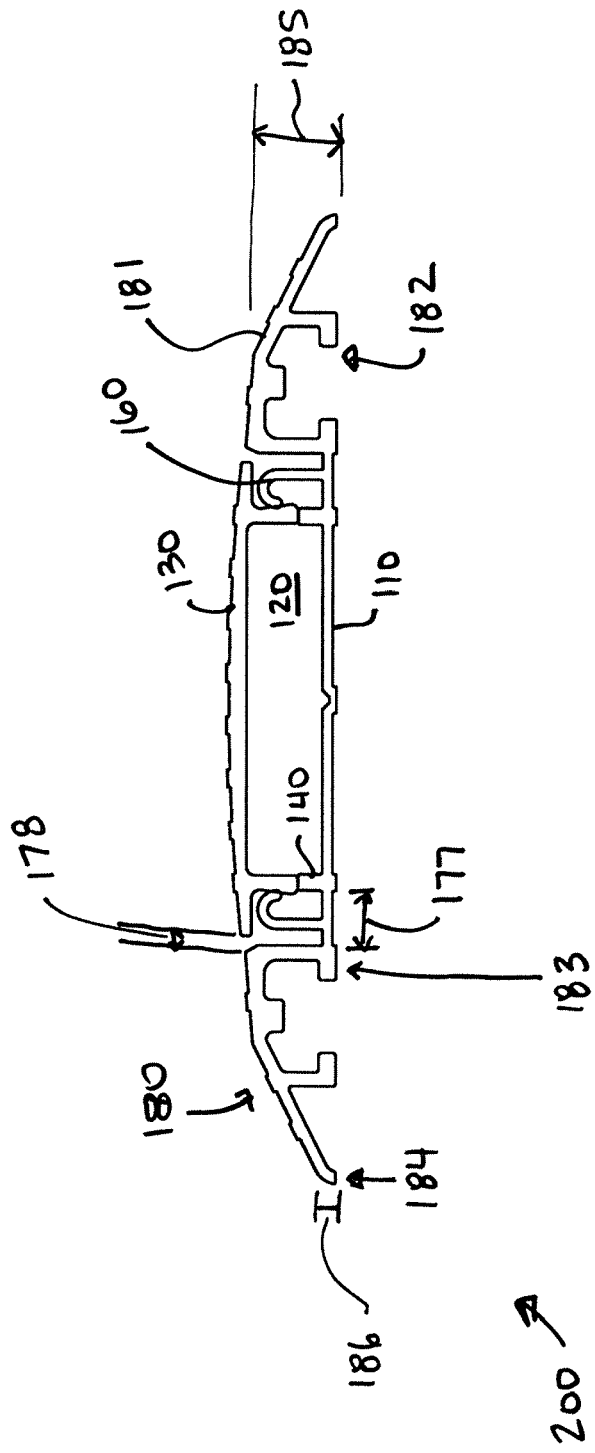
FIG. 2A illustrates a cross-sectional view of an implementation of an example raceway with integrated ramps.

As illustrated in FIG. 2A, in some implementations, the raceway may be utilized with one or more ramps. A ramp 180 may include solid and/or hollow members. A ramp 180 may include a first surface 181 and an opposing second surface 182. The first surface may be slanted (e.g., planar and/or at least partially curved). The second surface of the ramp may have a shape to allow it to reside on a floor surface (e.g., in a floor surface, on a subfloor, in flooring such as carpet, and/or on flooring). The ramp may include a first end 183 and a second opposing end 184. A height 185 of the first end 183 of the ramp may be less than a height 186 of the second end 184. During use, the first end may be disposed proximate the raceway. Utilizing a ramp may decrease the risk of the raceway acting as a trip hazard by providing a gradually decrease in height from the height of the raceway to the second end of the ramp. The decrease in height (e.g., between height 185 and height 186) over the length of the ramp may be selected to comply with government and/or industry guidelines (e.g., city codes, OSHA requirements, ADA requirements, etc.). The length of ramp(s) utilized with the raceway may be decreased with a low profile raceway due to the decreased height difference between a top of a flooring and the top of the raceway. Thus, ramps may be more structurally stable for a lower cost (e.g., since the length of the ramp may be decreased and less supporting and/or material thickness may be used to support loads applied to the ramp).

The ramp may be disposed at a gap 177 from the structural wall such that the cover does not rest on surface(s) of the ramp, when the cover is coupled to the housing. As illustrated, a gap 178 may exist between a top portion of the ramp 180 and an edge of the cover 130 such that the ramp and the cover do not overlap and/or contact each other. Thus, loads applied to the cover are transferred to the structural wall of the housing rather than the arms and/or ramps of the raceway, in some implementations. The ramps may be designed to carry a predetermined load (e.g., static and/or dynamic) on the surface of the ramp. The predetermined load may be based on industry and/or government standards and/or specific applications (e.g., heavy loads will roll over raceway, etc.). The ramps may not be damaged (e.g., substantially crushed, substantially dented, etc.) when subject to the predetermined load to comply with government and/or industry standards (e.g., maintaining ADA compliance and/or inhibiting creation of a trip hazard).

The ramps 180 may be integrated with the housing and/or separate from the housing of the raceway. FIG. 2A illustrates an implementation of a raceway with an integrated ramp. As illustrated, ramps 180 may be disposed proximate the flexible arms and/or closer to an end of the housing than the flexible arms. In some implementations, a ramp may be disposed approximately 0.5 inches or less from a structural wall of the raceway. FIG. 2B illustrates an implementation of an example raceway system with ramps disposed proximate the raceway. The ramps may be coupled to the raceway, in some implementations.

More than one ramp may be utilized on each side of a raceway, in some implementations, as illustrated in FIG. 2B. For example, a raceway may be provided in a kit and based on the installation method (e.g., above flooring, in flooring, in floor, etc.), one or more ramps may be selected. For example, two or more ramps may be utilized together (e.g., coupled together and/or disposed proximate each other) to transition from the height of the raceway to a smaller height. In some implementations, a first ramp may be provided for use in under-flooring applications and a combination of two or more ramps may be provided for use in above-flooring applications. In some implementations, the number of ramps utilized in an application with the housing may be based on the type of flooring utilized. For example, in an in-flooring application, one ramp may be utilized for a first type of flooring and more than one ramp may be used, in combination as illustrated in FIG. 2B, when a thicker flooring is utilized.

In some implementations, the raceway may be disposed in a recess of the floor and/or subfloor. Positioning the raceway or a portion thereof in a recess (e.g., in the floor and/or subfloor) may improve aesthetics for some users and/or reduce tripping. Ramps and/or other transition pieces (e.g., flange, connector, height adjuster, etc.) may or may not be utilized with the raceway when the raceway is disposed in a recess in the floor.

The raceway may be utilized with one or more receptacles to provide connectivity to devices. For example, the receptacle may include connections to communication and/or power sources via the cables in the raceway. For example, a first end of a raceway may be coupled to the communication and/or power source (e.g., via hardwiring and/or plugs). A second end of the raceway may be free (e.g., not coupled to the power and/or communication sources), in some implementations. Thus, the raceway may be capable of extending partially or fully across a location. One or more receptacles may be coupled to the raceway at one or more points along a length of the raceway. The position to which the receptacle is coupled to the raceway may be modified after installation, and/or receptacles may be removed or added to the raceway to increase the flexibility for modifying a raceway configuration after an initial installation.

Any appropriate receptacle may be coupled to the raceway. For example, receptacles similar to the receptacles described in U.S. patent application Ser. No. 15/967,455 and U.S. Pat. No. 9,960,554, which are incorporated by reference to the extent that they do not conflict with the herein described raceway, may be utilized hard wired to the cabling and/or via quick connect couplers to the cabling in the described raceway. Other receptacles may also be utilized, as appropriate.

A receptacle may include a socket that allows a user to couple a device to the socket(s) of receptacle to provide connectivity to a device (e.g., furniture, projectors, screens, and/or computers). For example, receptacle(s) may include a member with power sockets to provide power to laptops and/or furniture. Receptacles may include data ports to provide a connection to a communication source (e.g. Internet, intranet, etc.) to a device. A receptacle may be fixed and/or modular. For example, a number of sockets type(s) of sockets, and/or configuration of sockets on a modular receptacle may be adjusted. In a fixed receptacle, adjustment of a number of sockets, type of sockets, and configuration of sockets may be restricted. A socket and/or port of a receptacle may be coupled to cable(s) and/or conduit(s) in the raceway which provide connectivity (e.g., power and/or data) to the socket and/or port.

Figure 3B:
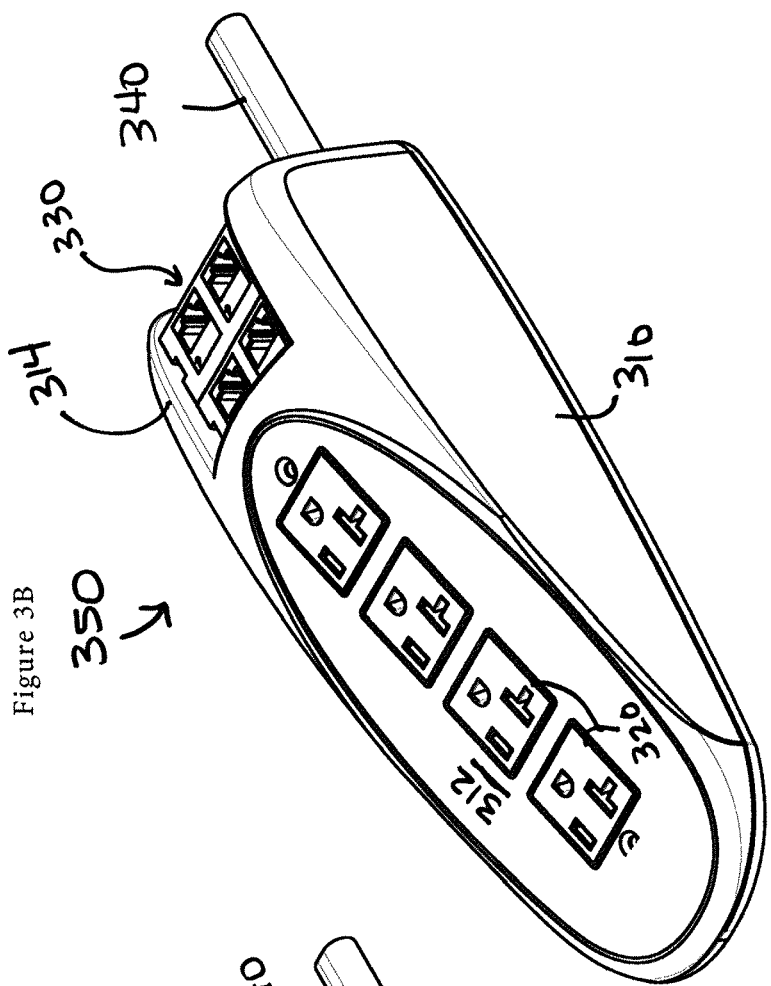
FIG. 3B illustrates a perspective view of an implementation of an example receptacle.
Figure 3A:
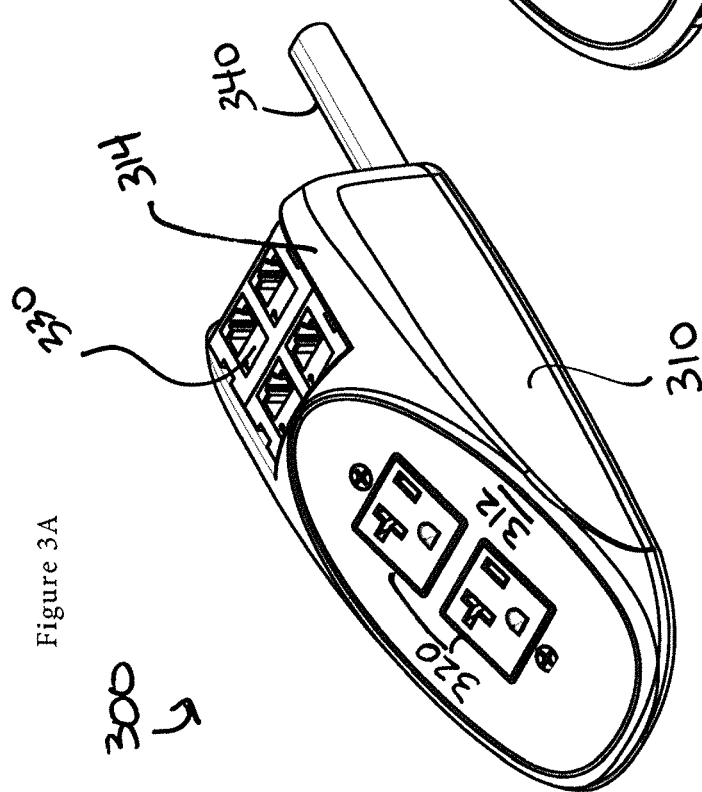
FIG. 3A illustrates a perspective view of an implementation of an example receptacle.
Figure 3C:
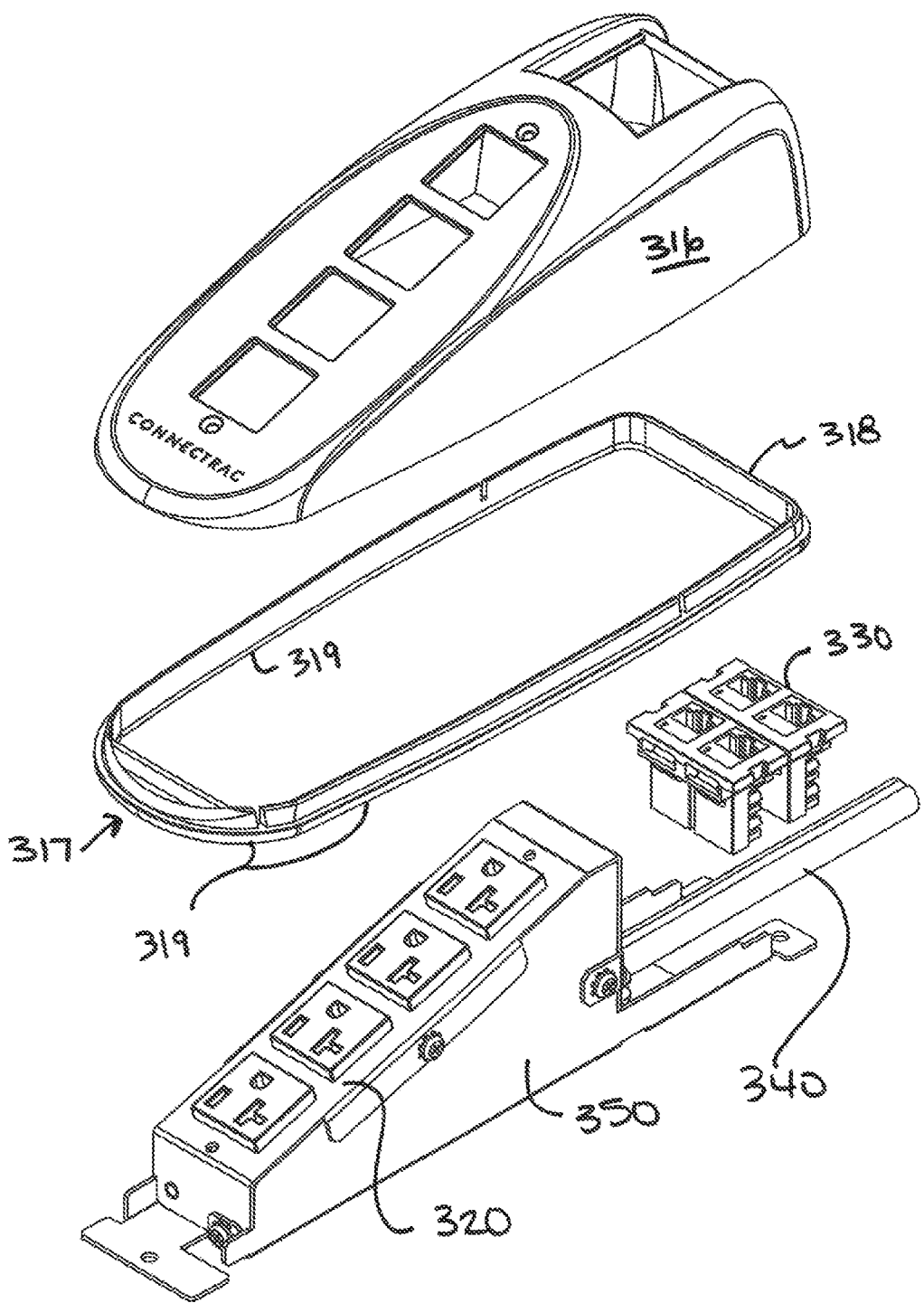
FIG. 3C illustrates an exploded view of an implementation of the example receptacle illustrated in FIG. 3B.

FIGS. 3A and 3B illustrate implementations of example receptacles. FIG. 3C illustrates an exploded view of the example receptacle illustrated in FIG. 3B, and FIG. 3D illustrates an implementation of an example receptacle coupled in to a raceway. As illustrated in FIG. 3A, receptacle 300 includes a housing 310. The receptacle 300 includes sockets such as 2 power sockets 320 and 4 data ports 330 (e.g., Ethernet ports). As illustrated in FIG. 3B, receptacle 350 includes a housing 310 with sockets such as 4 sockets 320 and 4 data ports 330. Although power sockets and/or Ethernet port are illustrated in the receptacles 300, 350, other types of sockets (e.g., to provide power and/or communication capability) may be utilized with the receptacle. For example, USB ports, proprietary ports such as Lightning ports, HDMI ports, fiber optic cable ports, and/or any other appropriate type of socket may be utilized. As illustrated, the housing 310 includes a slanted portion and an approximately planar portion. The slanted portion may allow more sockets to be disposed on a surface of a housing than a similarly sized planar portion. In some implementations, some sockets may be disposed on planar portions due to cabling requirements (e.g., cabling may occupy more space than can be provided by a slanted section of the receptacle).

In some implementations, when a receptacle is to be coupled to the raceway, a cover may be removed from a portion of the raceway to reveal an opening, as illustrated in FIG. 3D. The opening may include at least a portion of a cavity of the raceway, cables, and/or one or more connectivity couplers. The receptacle may be coupled to a connectivity coupler and/or cable accessible via the opening. For example, when the cover is removed from a portion of the raceway a connectivity coupler and/or a cable may reside in this portion of the raceway. In some implementations, the conduit in the cavity of the housing may be manipulated (e.g., pulled and/or pushed) such that the cables may be accessed through the opening produced when the cover is removed.

The housing 310 of the receptacle may include one or more sections as illustrated in FIGS. 3C and 3D. As illustrated, the housing 310 may include a top portion 316 and a skirt 317. A first end of the skirt 317 may couple with the top portion 316 of the housing, and a second opposing end of the skirt may contact a raceway (e.g., when the receptacle is disposed in a raceway). The skirt may have any appropriate size and/or shape. The first end of the skirt may contact at least a portion of a lower perimeter of the top portion 316. As illustrated, the skirt may be an annular ring that couples with a lower portion of the top portion. The second opposing end of the skirt may have a size and/or shape to mate, couple, and/or rest in a portion of the raceway (e.g., in the cavity, resting on a top surface, resting on a cover, contacting structural walls, etc.) In some implementations, the housing 310 may include wall(s) 319 (e.g., proximate a perimeter of the receptacle) that allow the receptacle to be coupled to the housing of the raceway via flexible arm(s) of the housing in a similar manner as the cover. For example, a force may be applied to the receptacle or a portion thereof to deflect flexible arm(s) of the housing in the section of the raceway to which the receptacle will be attached. The receptacle wall may be flared, include protrusions and/or recesses, and/or include other retaining members to allow at least a portion of the receptacle wall to be received and retained by the arm(s) of the housing (e.g., in the portion of the raceway to which the receptacle is coupling). To remove the receptacle, a force may be applied to the receptacle or a portion thereof to deform the arm(s) and allow removal of the receptacle. The raceway coupling member 317 may include a secondary wall that couples the raceway coupling member 317 and the top portion 316 of the housing of the receptacle.

In some implementations, the wall(s) 319 of the housing may close gap(s) between the housing and the raceway, when coupled. For example, the top portion and/or the skirt may be coupled to the raceway by any appropriate coupler, such as adhesive, screws, etc. The wall(s) 319 may reduce and/or close the gap between the skirt and the raceway (e.g., to increase aesthetics to a user, to inhibit debris and/or fluids entering the raceway, etc.).

As illustrated, one or more covers 130 may be utilized with the receptacle to cover the cavity of the housing of the raceway.

The sockets of the raceway may be coupled to the cables, as appropriate. For example, a power socket may be coupled to a power cable disposed in a cavity of the raceway and/or a data port may be coupled to an Ethernet line in the cavity of the raceway. In some implementations, the receptacle may include one or more cables 340 that couple sockets to the cables in the raceway. The cables 340 may be coupled to cables in the raceway in any appropriate manner, such as hardwiring and/or via connectivity couplers as described in U.S. patent application Ser. No. 14/776,916, which is hereby incorporated to the extent that it does not conflict with the teachings of the current application.

In various implementations, the raceway may be installed in a location (e.g., inside and/or outside) a structure. Rather than modifying the structure each time a modification to the power and communications accessibility is desired, the raceway may allow flexibility in providing power and communications in portions of the location and in modifications to the raceway. For example, the raceway may be installed on a floor, on a flooring substrate, on a wall, on a ceiling, indoor, outdoor, in furniture, on furniture, in equipment and/or on equipment. Allowing the raceway to be installed on top of an existing base, such as a flooring substrate and/or wall, may decrease installation costs and/or facilitate installation. The housing of the raceway may be coupled to a surface of the location (e.g., floor).

FIG. 4A illustrates a cut-away view of an implementation of an installation of an example raceway installed underflooring, and FIG. 4B illustrates an exploded view of the installed raceway illustrated in FIG. 4A. As illustrated, the raceway 100 is disposed on a floor or sub-floor. The flooring is then disposed over the length of the raceway. The receptacle(s) coupled to the raceway may be exposed through openings in the flooring. When a modification to the raceway is desired, the flooring may be removed (e.g., carpet squares may be lifted) to access the raceway. The cover(s) may be removed, as needed, to access the cables in the cavity, add and/or remove receptacles, lengthen and/or shorten the raceway, make repairs, etc. As illustrated, a ramp is utilized proximate the housing of the raceway to inhibit trip hazards that might be caused by the presence of the raceway.

FIG. 5A illustrates a cut-away view of an implementation of an installation of an example raceway installed in flooring, and FIG. 5B illustrates an exploded view of the installed raceway illustrated in FIG. 5A. As illustrated, the in-flooring installation allows the raceway to be exposed and visible to users. The flooring is installed such that the raceway and/or receptacles of the raceway are visible and accessible via openings in the flooring. For example, carpet tiles and/or flooring tiles may be run proximate the raceway but not over the raceway. Since carpet tiles are easily removed and/or replaced, if more raceways are added or raceways are removed, the flooring may also be easily modified. As illustrated, the ramps may be disposed under the flooring and not accessible without removing the flooring while the housing of the raceway is accessible without removing the flooring. In some implementations, one or more of the ramps may be utilized above the flooring (e.g., with an housing with an integrated ramp and/or separate ramps).

FIG. 6A illustrates a cut-away view of an implementation of an installation of an example raceway installed on flooring, and FIG. 6B illustrates an exploded view of the installed raceway illustrated in FIG. 6A. As illustrated, the raceway is installed above a flooring installation. The use of above-flooring installation may allow easier modifications and/or repair since the raceway is accessible without removing flooring. As illustrated, a housing with an integrated ramp may be utilized. In some implementations, one or more separate ramps may be utilized in connection with and/or in replacement of an integrated ramp. The use of above-flooring installations may be facilitated by low profile raceways since less ramping may be utilized (e.g., decreasing costs and/or increasing aesthetics).

In some implementations, a raceway kit may be provided. FIG. 7 illustrates an implementation of an example kit 700. The raceway kit may include a cover 130, one or more types of raceway housings 100, 200, ramps 180, and/or one or more receptacles (e.g., similar to the receptacles described herein and/or receptacles described in U.S. patent application Ser. No. 14/776,916). A user may assemble and install a raceway based on the criteria of the application. For example, a user may utilize housing 100 for an in flooring installation with or without ramps 180 and utilize a raceway 200 for above flooring installations. The use of the kit may allow a user to later modify and/or replace housings (e.g., since other components of the kit may be capable of working with the housings) based on needs, flooring changes, repairs, etc.

Figure 8C:
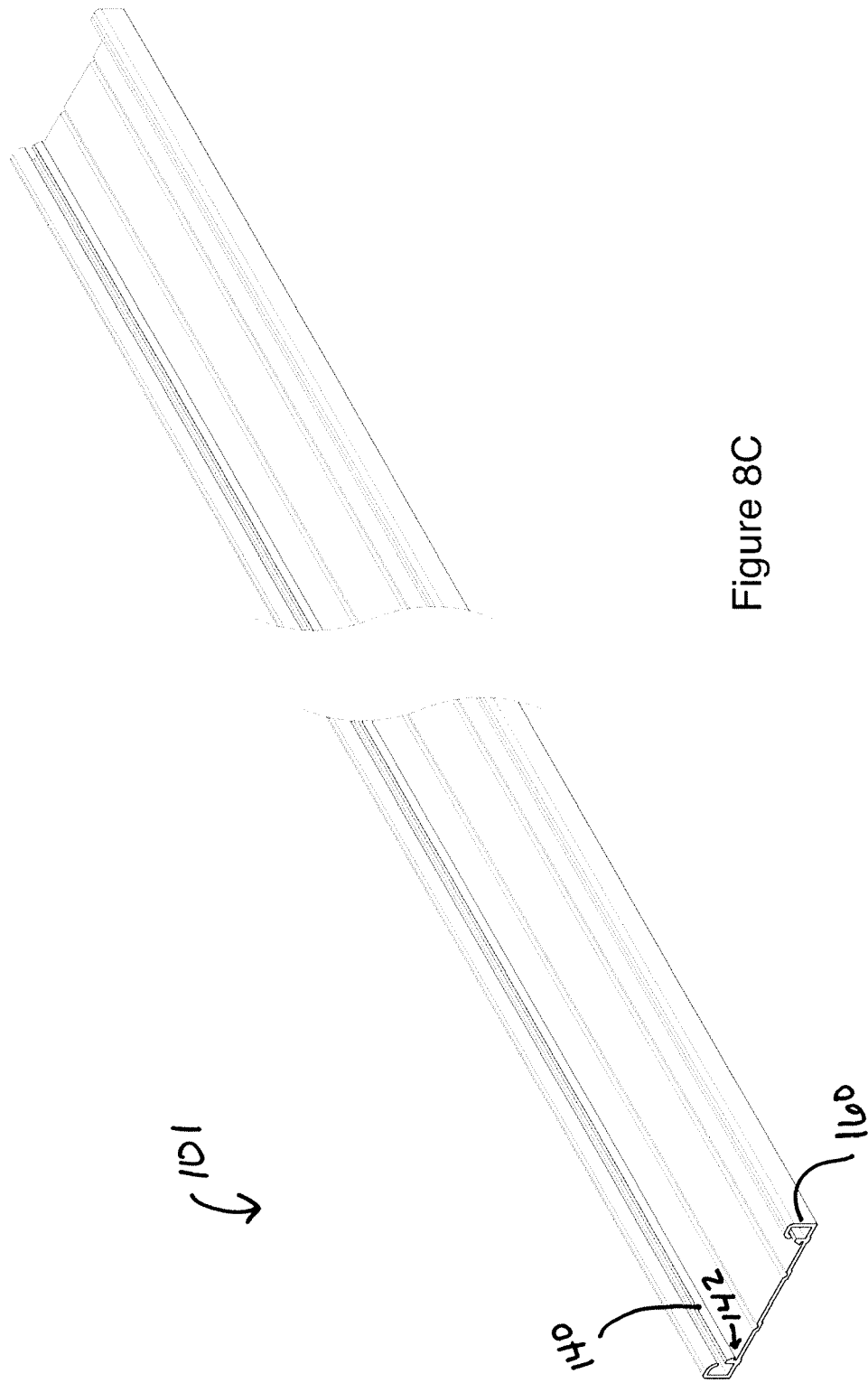
FIG. 8C illustrates a front perspective view of an implementation of the example raceway, illustrated in FIG. 8A.
Figure 8D:
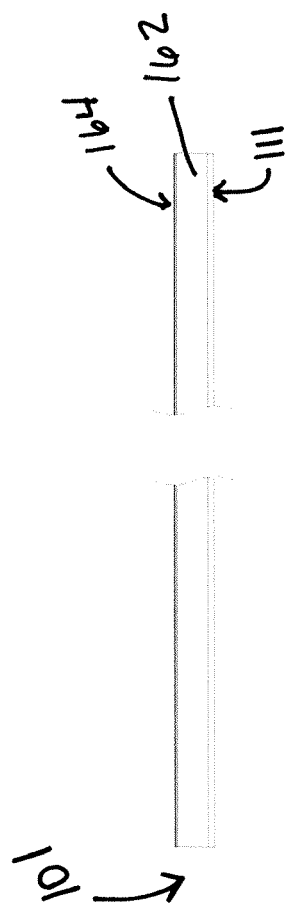
FIG. 8D illustrates a side view of an implementation of the example raceway, illustrated in FIG. 8A.
Figure 8E:
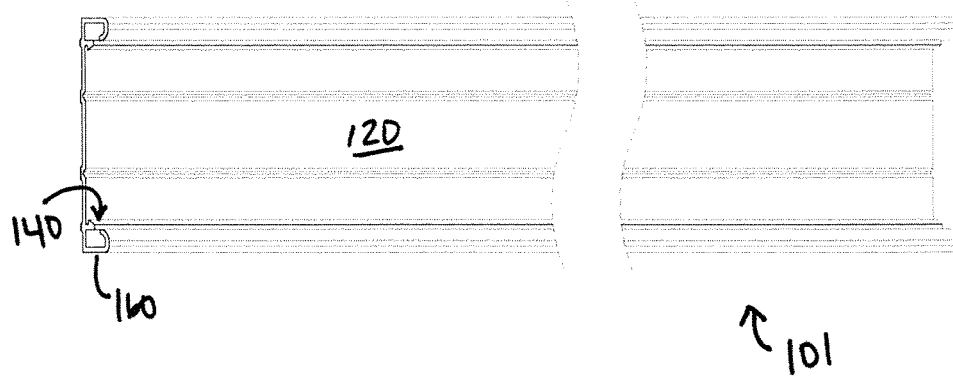
FIG. 8E illustrates a top perspective view of an implementation of the example raceway, illustrated in FIG. 8A
Figure 8F:
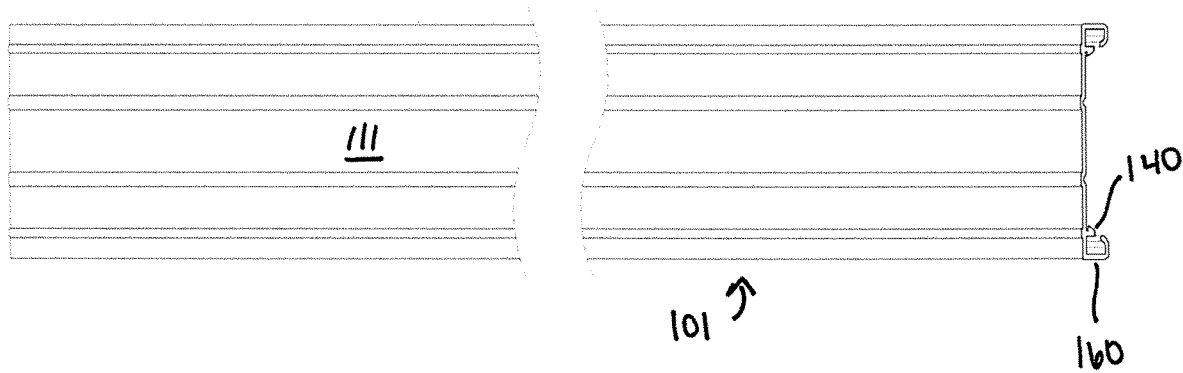
FIG. 8F illustrates a bottom perspective view of an implementation of the example raceway, illustrated in FIG. 8A Like reference symbols in the various drawings indicate like elements.

In some implementations, a wire clip may be utilized to facilitate wire management and/or installation of a raceway. The wire clip may couple with a raceway, in any appropriate manner (e.g., adhesive, flexible members, fasteners, etc.), such that a cavity is disposed between the wire clip and a base of a raceway. FIGS. 8A-8F illustrate implementations of an example raceway that is capable of receiving wire clip(s). FIG. 8A illustrates an exploded view of an implementation of an example raceway and wire clip and FIG. 8B illustrates an implementation of an example raceway coupled with a clip. FIGS. 8C and 8D illustrate a side view of raceway capable of coupling with a wire clip. FIG. 8E illustrates a top perspective view and FIG. 8F illustrates a bottom perspective view of an implementation of an example raceway capable of coupling with a wire clip.

As illustrated, a raceway 101 may be capable of coupling with a wire clip 810. The raceway may include a base 111 and arms 160 extending from the base. A structural wall 140 may extend from the base 111. Each arm may be disposed proximate an end of the base and/or between a ramp (not shown) and structural wall. At least one of the arms may be a flexible arm. Arm(s) may include a planar portion and a curved portion. A cover (not shown) may be coupled to the raceway to cover the cavity 120 in the raceway. Coupling of the cover with the raceway may include insertion of the walls of a cover into the raceway such that the walls contact and/or rest upon the structural walls 140 of the raceway 101. As the cover is inserted into the raceway, one or more of the flexible arms may contact wall(s) of the cover and deflect to couple the cover and the raceway.

Wires, such as data, power, and/or any other appropriate cabling, may be disposed in the cavity of the raceway. In some implementations, a conduit 150 may house one or more cables 155 and/or one or more cables 155 may be disposed individually in the cavity of the raceway. One or more wire clips 810 may be utilized to retain the cable(s) and/or conduit(s) in the cavity of the racetrack 101. For example, a length of cable may be disposed in the racetrack and one or more wire clips 810 may be coupled to the racetrack along the length of the racetrack (e.g., at regular or irregular intervals, proximate turns, proximate wall entries, along straight sections, etc.). A wire clip may inhibit cables and/or conduits disposed in the raceway from inadvertently moving out of the cavity in the raceway to facilitate installation and/or maintenance. For example, the cables and/or conduit may be pop out of the cavity of the raceway when a cover is removed. As another example, during installation while the wires are exposed (e.g., since the cover may not yet be installed), the wires may be inhibited from pulling out of the cavity of the raceway while the cable and/or conduit is laid in other segments of the raceway, be inhibited from being damaged by accidental crimping outside the raceway, etc.

A wire clip 810 may include a body 812 with two arms 814 extending from the base. The body may be at least partially flexible. For example, at least the arms of the wire clip 800 and/or the body of the wire clip may be flexible. A flexible wire clip may be compressed to facilitate insertion of the wire clip into the raceway and/or coupling of the wire clip with the raceway. A flange 816 may be disposed proximate an end of an arm 814. As illustrated, a flange 816 may be disposed at an end of each arm 814.

The structural wall 140 of the racetrack may include a recess 142 configured to receive at least a portion of the flange 816 of the wire clip 810. The recess in the structural wall may have a size and/or shape such that the structural wall can support the cover and/or predetermined forces applied to the cover (e.g., based on code, to support a person and/or furniture disposed on the structural wall) without substantially deforming. The structural wall may narrow along its height as it extends away from the base of the raceway. In some implementations, a wider base of the structural wall may accommodate recess(es) that are capable of receiving wire clips or portions thereof and/or narrower portions of the structural wall may increase the size of a cavity in the raceway.

At least a portion of the wire clip may be elastically deformable, in some implementations, such that the size and/or shape of the wire clip may be maintained to facilitate placement in the raceway and to maintain the wire clip in the raceway. To install the wire clip 810, a force may be applied to the ends 817, 818 of the wire clip 810 (e.g., the ends may be squeezed) to reduce the length 819 of the wire clip to facilitate insertion of the flanges 816 of the wire clip into the recesses 142 of the raceway. In some implementations, the body of the wire clip may be compressed such that the length of the wire clip is reduced to facilitate insertion of the wire clip in the raceway (e.g., the wire clip may be approximately c-shaped and the ends of the "c" may be drawn closer together during insertion). Once the flanges of the wire clip are disposed in the raceway, the force may be removed from the ends. In some implementations, the recess may have a depth such that a force is maintained on the ends of the wire clip.

In various implementations, the raceway may or may not include the wire clip and/or one or more of the other features of raceways, as described. For example, a raceway with a channel configured to receive a wire clip may be utilized without wire clips. As another example, the wire clip may be utilized with a raceway without a channel configured to receive the wire clip. The wire clip may be otherwise coupled to the raceway, such as by adhesive, tape, fasteners, etc.

Although users have been described as a human, a user may be a person, a group of people.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a port" includes a combination of two or more ports and reference to "flexible arm" includes different types and/or combinations of flexible arms. A "raceway" includes different types and/or combinations of raceways. As another example, "coupling" includes direct and/or indirect coupling of members.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A raceway to provide connectivity, the raceway comprising:
    a housing, wherein the housing comprises:
        a base, wherein the base comprises: a first side, a second side, and a length;
        two flexible arms extending from the base of the housing, wherein one of the flexible arms is disposed proximate the first side of the base, and wherein the other flexible arm is disposed proximate the second side of the base, and wherein each flexible arm comprises:
            a planar portion; and
            and a curved portion;
        two structural walls extending from the base of the housing, wherein each of the structural walls is disposed between the two flexible arms, and wherein a gap resides between each of the flexible arms and each of the structural walls, and wherein the structural walls are capable of supporting a cover disposed on the structural walls, and wherein at least a part of each of the flexible arms contacts the cover disposed on the structural walls;
    a cavity disposed between the two structural walls, wherein the cavity is capable of receiving at least one of cables or conduit to provide connectivity.

2. The raceway of claim 1 further comprising at least one cover configured to couple with the housing; wherein the cover comprises two walls extending from an inner side of the cover; wherein each of the walls is disposed such that when the cover is inserted into the raceway, each of the walls is configured to be disposed on one of the structural walls of the raceway such that force exerted on the cover is at least partially transferred to the two structural walls of the raceway.

3. The raceway of claim 2 wherein the cover further comprises a first flange extending from a first end of the cover and a second flange extending from a second end of the cover, wherein the first flange and the second flange may inhibit damage to the raceway.

4. The raceway of claim 2 wherein the cover further comprises a first flange extending from a first end of the cover and a second flange extending from a second end of the cover, and wherein the first flange and the second flange cover the gaps residing between the flexible arms and the structural walls of the raceway.

5. The raceway of claim 1 further comprising at least one of a cable or a conduit disposed in the cavity of the raceway.

6. The raceway of claim 1 wherein each of the flexible arms comprises a first end of the planar portion with greater thickness than a second end of the planar portion to allow the second end to deform when subject to a predetermined force.

7. The raceway of claim 1 wherein the raceway has a height of less than approximately 1 inch.

8. The raceway of claim 1 wherein the raceway has a width of between approximately 2 and approximately 3 inches.

9. The raceway of claim 1 further comprising a first ramp coupled to the first side of the base and a second ramp coupled to the second side of the base.

10. The raceway of claim 1 further comprising a first ramp disposed proximate the first side of the base and a second ramp disposed proximate the second side of the base.

11. The raceway of claim 1 further comprising:
    one or more cables to provide connectivity, wherein the one or more cables are disposed in the cavity of the raceway; and
    one or more receptacles coupled to the raceway, wherein each of the receptacles are coupled to at least one of the cables such that the receptacles can provide connectivity via one or more of the coupled cables.

12. The raceway of claim 11 wherein each of the receptacles comprises at least one of a socket or a port.

13. The raceway of claim 1 wherein one or more of the structural walls comprises one or more recesses capable of receiving and retaining a portion of a wire clip.

14. The raceway of claim 13 further comprising one or more wire clips comprising a base, a first flange disposed at a first end of the base, and a second flange disposed at the second end of the base; wherein the first flange is configured to be disposed at least partially in at least one of the recesses in at least one of the structural walls of the raceway, and wherein the second flange is configured to be disposed at least partially in at least one of the recesses in at least one of the other structural walls of the raceway.

15. A method of installing a raceway comprising:
providing a raceway at a location, wherein the raceway comprises:
a housing, wherein the housing comprises:
a base, wherein the base comprises: a first side, a second side, and a length;
at least two flexible arms extending from the base of the housing, wherein one of the flexible arms is disposed proximate the first side of the base, and wherein the other flexible arm is disposed proximate the second side of the base, and wherein each flexible arm comprises:
a planar portion; and
and a curved portion;
two or more structural walls extending from the base of the housing, wherein a gap resides between each of the flexible arms and each of the structural walls, and wherein the structural walls are capable of supporting a cover disposed on the structural walls, and wherein at least a part of each of the flexible arms contacts the cover disposed on the structural walls;
one or more cavities disposed in the raceway, wherein the cavity is capable of receiving at least one of cables or conduit to provide connectivity;
disposing one or more cables in at least one of the cavities in the raceway;
coupling one or more covers to the raceway, wherein each of the covers comprises at least two walls extending from an inner surface of the cover, and wherein coupling each of the covers to the raceway comprises inserting the cover at least partially into the raceway such that each of the walls of the cover is disposed at least partially in the raceway and is disposed on one of the structural walls, wherein inserting the cover at least partially into the raceway causes at least a part of at least one of the flexible arms to at least partially deform and contact at least one of the walls of the cover to couple the raceway and the cover.

16. The method of claim 15 further comprising retaining one or more of the cables in at least one of the cavities by coupling one or more wire clips to the raceway, wherein coupling the one or more wire clips to the raceway comprises inserting flanges of each of the wire clips into recesses disposed in each of the structural walls of the raceway.

17. The method of claim 15 further comprising disposing one or more ramps proximate one or more of the sides of the base.

18. A raceway to provide connectivity, the raceway comprising:
a housing, wherein the housing comprises:
a base, wherein the base comprises: a first side, a second side, and a length;
at least two flexible arms extending from the base of the housing, wherein one of the flexible arms is disposed proximate the first side of the base, and wherein the other flexible arm is disposed proximate the second side of the base, and wherein each flexible arm comprises:
a planar portion; and
a curved portion;
two or more structural walls extending from the base of the housing, wherein a gap resides between each of the flexible arms and each of the structural walls, and wherein the structural walls are capable of supporting a cover disposed on the structural walls, and wherein at least a part of each of the flexible arms contacts the cover disposed on the structural walls; and
one or more cavities disposed in the raceway, wherein the cavity is capable of receiving at least one of cables or conduit to provide connectivity.

19. The raceway of claim 18 further comprising at least one cover configured to couple with the housing; wherein the cover comprises at least two walls extending from an inner side of the cover; wherein each of the walls is disposed such that when the cover is inserted into the raceway, each of the walls is configured to be disposed on one of the structural walls of the raceway such that force exerted on the cover is at least partially transferred to at least one of the structural walls of the raceway.

20. The raceway of claim 18 wherein one or more of the structural walls comprises one or more recesses capable of receiving a portion of a wire clip, and wherein the wire clip is configured to retain cables disposed in at least one of the cavities of the raceway.

* * * * *